No. 724,662. PATENTED APR. 7, 1903.
A. H. BUCKELEW.
CONTROLLING DEVICE FOR ELEVATORS.
APPLICATION FILED NOV. 17, 1897.
NO MODEL. 4 SHEETS—SHEET 1.

Witnesses
Inventor
Albert H Buckelew
Attorneys

No. 724,662. PATENTED APR. 7, 1903.
A. H. BUCKELEW.
CONTROLLING DEVICE FOR ELEVATORS.
APPLICATION FILED NOV. 17, 1897.
NO MODEL. 4 SHEETS—SHEET 2.
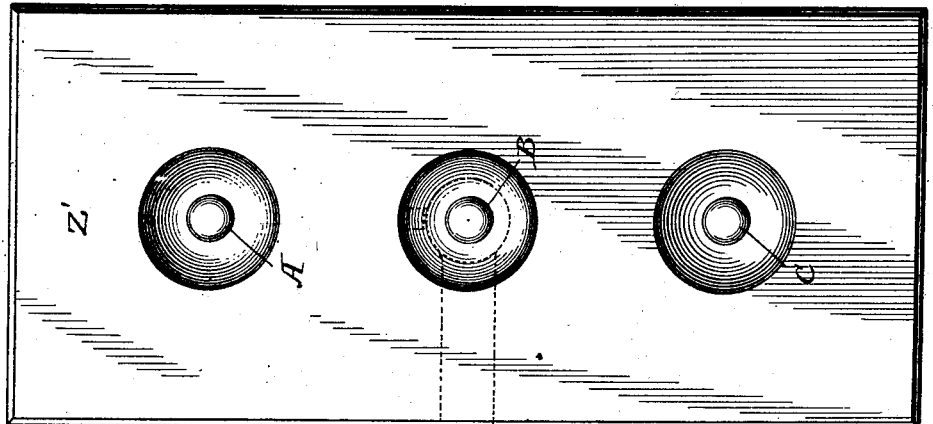
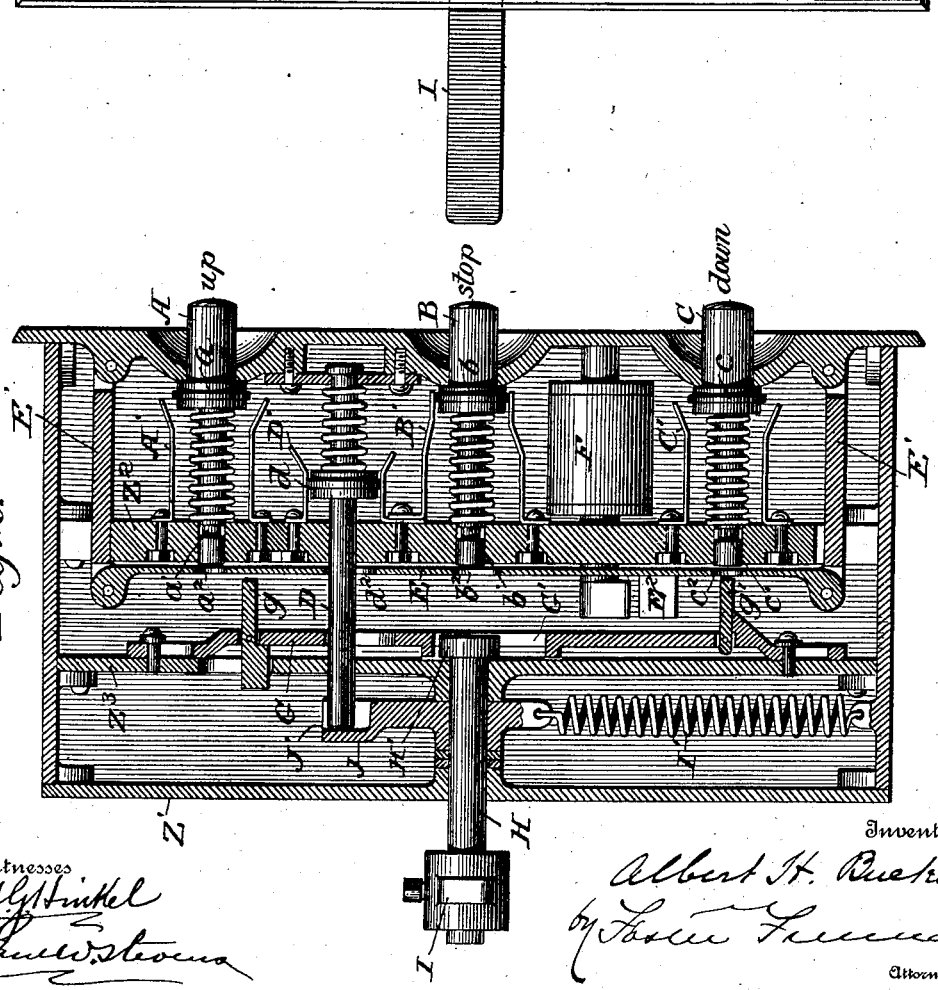

No. 724,662. PATENTED APR. 7, 1903.
A. H. BUCKELEW.
CONTROLLING DEVICE FOR ELEVATORS.
APPLICATION FILED NOV. 17, 1897.
NO MODEL. 4 SHEETS—SHEET 3.

Witnesses
Inventor
Albert H Buckelew
by
Attorneys

No. 724,662. PATENTED APR. 7, 1903.
A. H. BUCKELEW.
CONTROLLING DEVICE FOR ELEVATORS.
APPLICATION FILED NOV. 17, 1897.
NO MODEL. 4 SHEETS—SHEET 4.

Witnesses
Inventor
Albert H. Buckelew
by Foster Freeman
Attorneys

UNITED STATES PATENT OFFICE.

ALBERT H. BUCKELEW, OF NEWARK, NEW JERSEY, ASSIGNOR, BY MESNE ASSIGNMENTS, TO THE OTIS ELEVATOR COMPANY, OF EAST ORANGE, NEW JERSEY, A CORPORATION OF NEW JERSEY.

CONTROLLING DEVICE FOR ELEVATORS.

SPECIFICATION forming part of Letters Patent No. 724,662, dated April 7, 1903.

Application filed November 17, 1897. Serial No. 658,852. (No model.)

*To all whom it may concern:*

Be it known that I, ALBERT H. BUCKELEW, a citizen of the United States, residing in the city of Newark, county of Essex, State of New Jersey, have invented certain new and useful Improvements in Controlling Devices for Elevators, of which the following is a specification.

This invention relates to apparatus for controlling elevators from the car or from different landings adjacent the elevator-well, and has for its object to provide simple and effective means whereby this can be accomplished and whereby the elevator may be safely operated; and to these ends the invention consists in various features of construction and arrangements of parts having the general mode of operation substantially as hereinafter more fully set forth.

Figure 1:
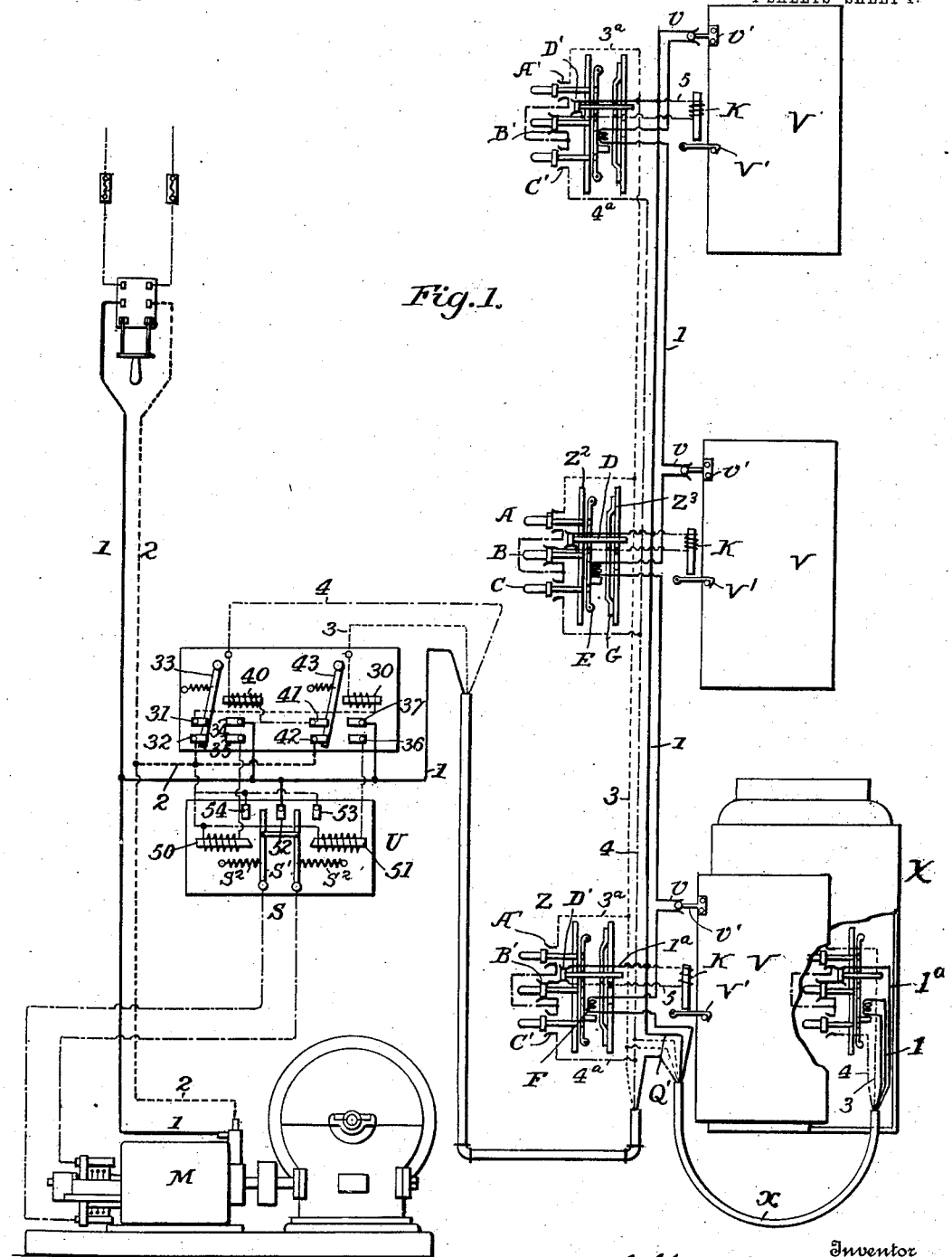
Figure 5:
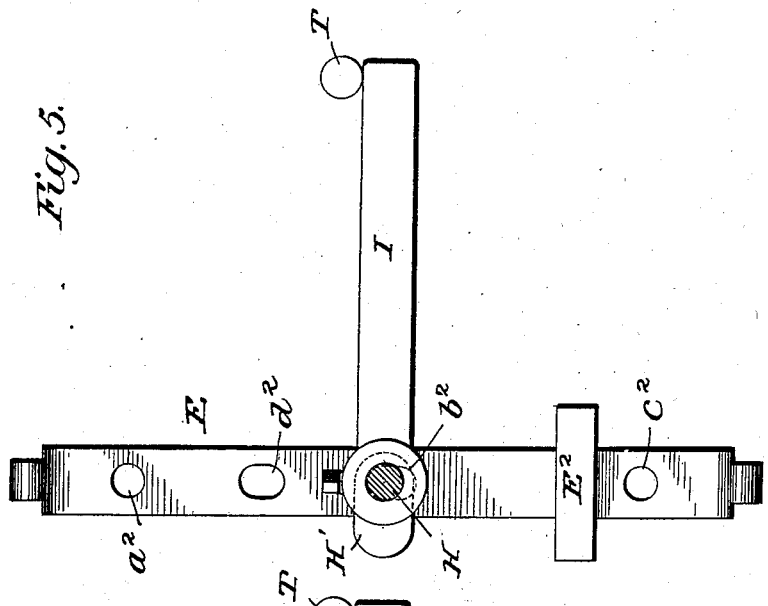
Figure 4:
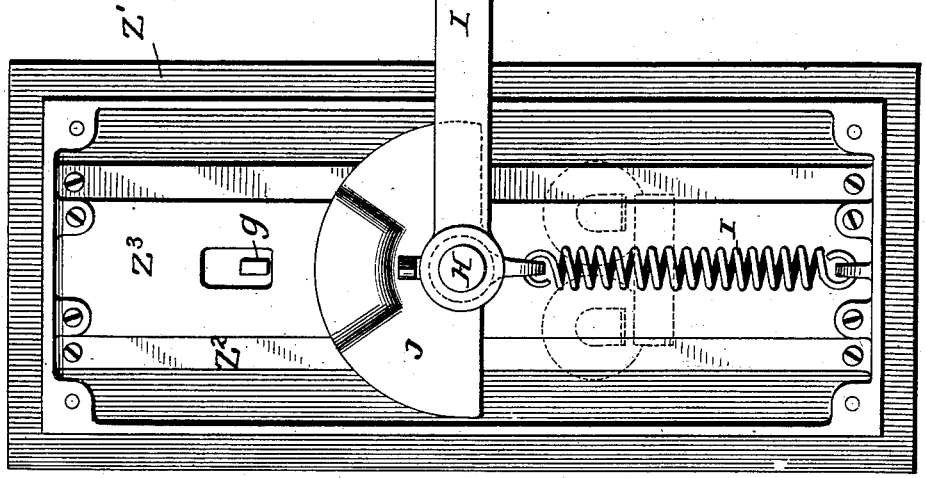
Figure 6:
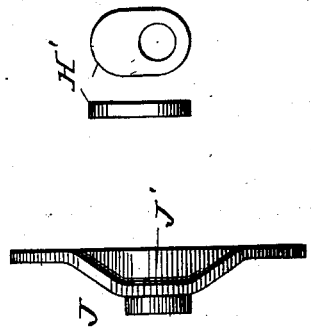

In the accompanying drawings, Figure 1 is a diagrammatic elevation of an apparatus embodying these improvements. Fig. 2 is a sectional view of the box, circuit-breakers, and appliances as arranged at each landing. Fig. 3 is a rear view of the said box; Fig. 4, a rear view with the back plate removed; Fig. 5, a detached view of part of the apparatus; Fig. 6, an edge view of the cams of said apparatus, and Fig. 7 a sectional view of the said modified form of box.

The invention is designed to provide a simple, effective, and automatically-operating apparatus for controlling elevators and the like whereby an operator on the car is dispensed with and whereby any person in the car or at any one of the landings by simply operating a push-button can control the movements of the car to bring it to the landing, where it will automatically stop.

Another object is to so arrange the circuits and devices that the door of the well at the landing will be electrically controlled so that it cannot be opened except when the elevator-car is opposite the landing and so that the car cannot be moved from the landing until the well-door is closed; also, to provide automatic locking devices so arranged and operating that if the car is away from the landing at which the operator presents himself only the proper push-button can be operated to bring the car to that landing; again, to provide automatic locking devices, so that when a push-button at any one landing has been operated to bring the car to that landing the button is locked and remains locked until the car reaches the landing and no other button at any other landing will interfere with the operation of the devices—in other words, providing a non-interfering arrangement of circuits for the push-buttons which is automatically controlled.

This is a general statement of the objects of the invention; but other objects and purposes will appear hereinafter, and the means for accomplishing these objects illustrated in the drawings, and which are the preferred means, (although other and equivalent constructions and arrangements of parts may be used,) will now be described with sufficient clearness to enable those skilled in the art to make and use the invention.

The car or platform X, of any suitable construction, is connected to be operated in any desired manner by an engine or motor M, which may be electrical or otherwise, but which is controlled by electrically-operated devices. In the present instance the electric motor M is shown of a typical construction, and there is also provided a reversing-switch U, which in the present instance is automatic in its operation and which controls the flow of current through the motor, either the field or the armature, to reverse the same, in the present instance being shown to reverse the armature and also shown as arranged to start and stop the motor automatically under the control devices Z at the different landings and on the car. This reversing-switch is typical merely, and other forms and constructions can be used, it only being necessary that the circuits can be controlled by the operator manipulating the control devices at any landing or on the car.

In the form of control device Z shown more particularly in Figs. 1 to 6 there is a box or casing Z', containing the circuit-breakers, push-buttons, and other devices by which the circuits are controlled, and a description of one of them is sufficient, the construction being practically the same whether it is applied to a car or to a landing. Mounted in the front of the casing Z' of the control device Z are three push-buttons A B C, conveniently designated by the indications "Up," "Stop," "Down," or equivalents, and normally these buttons project outside the case and are preferably mounted in recesses, as shown, although this is not material. Arranged within the case is a partition or platform $Z^2$, on which are conveniently mounted the terminals of the circuit-breakers A' B' C' D', coöperating with the push-buttons A B C and the rod D to open and close the circuits, as hereinafter described. The push-buttons and rod D are all under stress of springs tending to hold them in their normal positions, and they are provided with some sort of contact closing device—as, for instance, the rings or disks $a\ b\ c\ d$—and the stems of the push-buttons pass through openings in the face of the casing Z' and in the partition $Z^2$, and these stems are also provided with locking devices, shown in the present instance as grooves $a'$ $b'$ $c'$, coöperating with the electrically-controlled locking-plate E. This plate E is shown as pivotally mounted on the rocking arms E', passing through slots in the partition $Z^2$, and the plate is provided with openings $a^2$ $b^2$ $c^2$ $d^2$, corresponding with the push-buttons and rod D. The openings $a^2$ $c^2$ are all about the size to permit the stems of the respective push-buttons A and C to pass therethrough, while the opening $b^2$ is elongated so as to permit the stem of the push-button B to pass therethrough whatever may be the position of the locking-plate E. This plate is shown in its normal position in Fig. 2 and is arranged to be operated electrically in any suitable way, and, as shown, there is a magnet F, the pole of which extends through the partition $Z^2$ and coöperates with a projection $E^2$, acting as an armature for the magnet, and this is so arranged that when the magnet is energized the locking-plate E will be lifted slightly, and if perchance the push-button A has been depressed or pushed inward the edge of the opening $a^2$ will engage the groove $a'$ and lock the push-button in its depressed condition, and at the same time the opening $c^2$ will be displaced out of alinement with the push-button C, so that it cannot be depressed or operated, while the opening $b^2$ being enlarged will permit the operation of the push-button B, whatever may be its position. When the magnet F is deënergized, the electrically-actuated locking-plate E falls to its normal position or is moved thereto by a suitable spring or other device. It may be stated that the opening $d^2$ in the plate E is also elongated, so as not to interfere with the operations of the rod D, as hereinafter described. It will thus be seen that if one of the push-buttons, as A, is depressed, closing the circuit, as hereinafter set forth, it will be locked in position through the medium of the locking-plate E and magnet F and be held locked until the circuit is broken, releasing the magnet and locking-plate, permitting the push-button to resume its normal position, and while any one button of any controller-box is thus locked the buttons A and C of the other controller-boxes are locked against operation, so that no one can interfere with the operator at the station first operating the push-buttons. The same is true when any one of the push-buttons C is operated; but any one of the push-buttons B can be operated, regardless of the position of the locking-plate E, to stop the elevator at any time in case of emergency or otherwise. Also mounted in the casing Z' is another partition or platform $Z^3$, and this serves as a convenient support for the mechanical locking-plate G, which is arranged to slide on the partition by any suitable means and is provided with stop-pins $g$ $g'$, shown as pivotally mounted in the plate, the pin $g$ in this instance moving in a slot in the partition $Z^3$, while the pin $g'$ rests on a projection on the plate G, and these pins are so arranged that when the plate G is in one position one of the pins will be opposite the push-button C, for instance, and when it is in another position one of the pins will be opposite the push-button A, and when one of the pins is so opposite one of the push-buttons such button cannot be operated to close the circuit. This mechanical locking-plate G is automatically operated by the passing elevator-car and moved either upward or downward and is preferably held frictionally in the position to which it is moved, and thus prevents the operation of any one or the other of the push-buttons A or C of the particular control device. In order to move this mechanical locking-plate, in the present instance it is shown as provided with a central enlarged opening G', in which works an eccentric H' on a shaft H, shown as mounted in the box Z' and bearing in the partition $Z^3$, and when the shaft rocks the cam or eccentric H' will make contact with either one or the other of the upper or lower bearing portions of the opening G' and raise or lower the plate G, the opening being of such size as to permit a certain amount of movement, allowing the eccentric to return to its normal position after raising or lowering the plate G.

The shaft H in the present instance is provided with an arm I exterior of the casing, which is adapted to be operated in accordance with the movements of the elevator, as by a projection T, Figs. 4 and 5, so placed that as the elevator-car approaches any landing it will engage the arm or lever I, turn the shaft H, and move the eccentric H' to shift the locking-plate G, and as the elevator comes to rest or the projection passes off from the arm I the shaft H is restored to its normal position by any suitable means, as a spring I', while the plate G is held in the position to which it is moved by friction or otherwise until positively actuated in the opposite direction by the eccentric.

Mounted on the shaft H is a cam J, having a recessed portion J', adapted to engage the projecting end of the rod D, and when the shaft H is rocked in either direction the walls of the recess J' force the rod D outward, breaking the circuit at D'; but when the cam J is restored to its normal position the circuit is closed by the spring upon the rod, so that this circuit-breaker is normally closed and remains closed, except when automatically broken by the movements of the car through the medium of the cam J.

Such being the general construction of each controller-box, the arrangement of circuits shown in the drawings will now be described, and the operation of the apparatus will then be explained.

In the present embodiment utilizing an electric motor the mains plus and minus lead through the usual safety devices and switch by conductors 1 and 2 direct to the field-magnets of the motor. A branch conductor 1 (which for convenience is designated a "supply conductor" and is shown in heavy lines, while the return conductors are shown in broken lines and may be termed "operating-conductors" for convenience) leads through the ordinary cable $x$, which is shown broken at the lower floor and first embraces the coils of the magnet F at each control device and includes a circuit-breaker $v$, controlled by a contact $v'$ on the door V at each landing, so arranged that when the door is closed the circuit will be completed, but when the door is opened the circuit will be broken and from the upper floor and circuit-breaker $v$ returns, being connected by branches $1^a$ through the circuit-breaker D', thence through the circuit-breaker B', being connected to one of the terminals of each circuit-breaker A' C'. It will be seen that in the normal condition the circuit-breakers D' and B' are closed, while the circuit-breakers A' C' are normally open, and the supply-conductor 1 thus leads to one of the contacts of each circuit-breaker A' C' in each control device on the landings and on the car, and this conductor is complete to this extent when all the doors are closed. Connected to each circuit-breaker A' of each control device is a conductor 3, it being connected by the branches $3^a$, and connected to one of the terminals of each circuit-breaker C' is a conductor 4, it being connected by branches $4^a$, and these conductors (indicated by broken lines) constitute what are designated the "operating-conductors." In the present instance these operating-conductors lead to the relay or reversing switch U, the conductor 3 including a magnet 30, terminal 31, terminal 32, which latter is connected to the minus-conductor 2, and these terminals are normally closed by switch 33. The conductor 4 includes a magnet 40 and terminals 41 42, which latter is connected with the minus-conductor 2 and is controlled by a switch 43 of the relay. The relay is also provided with terminals 34 35, also controlled by the switch 33, the terminal 34 being connected with the supply-conductor 1 and the terminal 35 including a magnet 50, switch S, controlling the armature-circuit of the motor and also leading to the return-conductor 2, a branch including the magnet 51 and terminal 36, the corresponding terminal 37 of which is connected to the conductor 1, and these terminals are controlled by the switch-arm 43. The conductor 1 is connected to a terminal 52 of the switch S, and terminals 53 54 are connected together and to the conductor 2, the switch-arms S' being preferably normally held out of contact with the terminals by springs $S^2$, contact being made by one or the other of the magnets 50 51, closing the circuit through the armature of the motor M in one or the other direction, as the case may be. Each door V is controlled by a latch V', which latch, as shown, forms the armature of a magnet K, which includes a conductor 5, branching from conductor 1 and connected to one of the terminals of the circuit-breakers B' D'.

The operation of the device is as follows, the parts being in the position shown in the drawings: The mechanical locking device G is in a position so that its pin $g'$ is opposite the "Down" push-buttons C and prevents their operation. It may be remarked that in the cage the controlling device is not necessarily provided with a mechanical locking-plate. If now an operator at one of the landings—as, for instance, the top landing—wants the elevator, if he attempts to press the button C it will not be operated sufficiently to close the circuit-breaker C' on account of the mechanical locking device. If he presses the push-button A and closes the circuit-breaker A' and all the doors are closed, a circuit will be established through the conductor 1, circuit-breaker A', conductor 3, to the relay, which will energize magnet 30, draw the switch-arm 43 to a position to close the contacts 36 37, energize the magnet 51, so as to move the switch-arms S', in a position to operate the motor to lift the elevator. As soon as the circuit is closed the magnet F is energized, lifting the electrically-actuated locking-plate E, and the edge of the opening $a^2$ therein engages the groove $a'$ of the button A and holds it in position, and at the same time the opening $c^2$ is moved to a position to prevent the operation of the "Down" push-button C. In all the other control devices the electrically-actuated locking-plate E will be moved to a position to prevent the operation of either of the "Up" or "Down" push-buttons A or C and be so held by the magnet F until the circuit is broken. Thus each control device except the one in which the push-button was first operated is locked against operation or interference with the use of the elevator. As the elevator travels upward the projection T comes in contact with the arm I of each control device and through the medium of the cam H' operates the mechanical locking-plate G, so that its pin $g$ comes opposite the "Up" push-button A and prevents its operation. As the car passes an intermediate station, for instance, the cam J operates the rod D to break the circuit at the circuit-breaker D'; but as the circuit was not complete through the intermediate control device it produces no effect on the operation of the elevator. When the elevator reaches the upper landing, the push-button B is operated, breaking the circuit at the circuit-breaker B', and this releases the electrically-operated locking-plate E, releasing the push-button A, breaking the circuit at A', and the elevator comes to rest. At about the same time the projection T operates the arm I and through the medium of the cam J moves the rod D to break the circuit at D', and this breaks a short circuit around the magnet K, allowing it to be energized to lift the latch V', so that the door V can be opened, and when this door V is opened the circuit-breaker v is operated, and the circuit cannot be closed, even though any one of the push-buttons at any of the landings is operated, and not until the door V is closed and locked can the elevator be started.

It will be seen that the elevator in its upward movement has moved the mechanical locking-plate G, so as to prevent the operation of the push-buttons A at any of the intermediate stations. Then if an operator below pushes any one of the buttons C the circuit will be closed and the series of operations repeated substantially as described, the circuit being closed through the operating-conductor 4 and relay in such a direction as to reverse the current in the armature and drive the motor in the proper direction to draw the car.

From the above description it will be seen that each control device is provided with two locking devices, one mechanically and the other electrically operated; that the mechanical locking device is operated by the passing car, so that the proper push-button, either "Up" or "Down," only can be operated, as the case may be; that the electrically-operated locking device locks the push-button of the first control device operated and locks all the others, so that after a push-button in one of the control devices has been operated none of the other control devices can be operated to interfere therewith until the elevator reaches its proper position.

It will be observed that the operator at the station can at any time operate the "Stop" push-button B to break the circuit, and a person on the car can also operate it, and a person on the car can go up or down from any landing, as it is manifest that the mechanically-operated locking device will be properly arranged for this purpose.

The apparatus is relatively simple and effective and so arranged as to prevent the movement of the elevator-car unless the door at the landing is closed, and it further prevents the opening of the door at any landing unless the car is opposite thereto.

Figure 7:
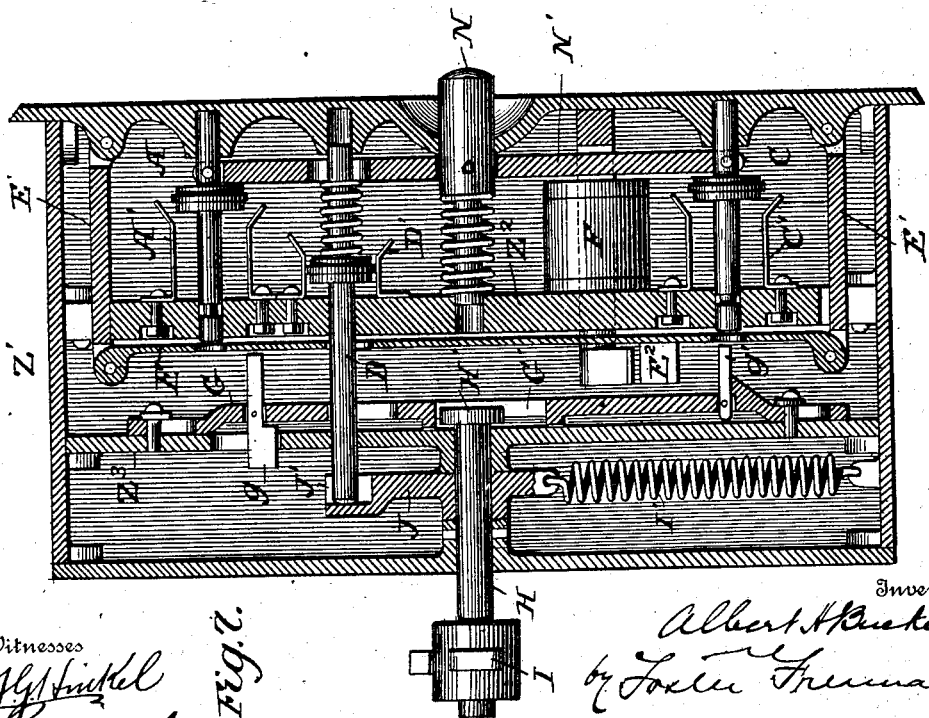

In Fig. 7 is shown a modification of the control device, where the two circuit-breakers A' C' are controlled by a single central push-button N, pivotally connected to a lever N', which is also pivotally connected to the buttons A and C. The "Stop" push-button B of the first construction is omitted, and in order to stop the car after the button N has been pressed at any particular landing and when the elevator reaches the landing and as soon as the magnet K is energized the latch is lifted and the door may be opened by the operator, and the circuit will be broken at the points v v' and the elevator stopped. It is deemed unnecessary to describe in detail all the parts of this modification, as they are substantially the same as those shown in Fig. 2, with the exception that a single push-button operates the starting circuit-closers, and it will be evident that the one or the other will be operated when the central push-button N is pressed, according to the position of the mechanical locking-plate G and its stops g g' with relation to the buttons A and C.

What is claimed is—

1. In a control device for elevators, the combination with the circuit-breakers, of a mechanically-operated locking device, and means for operating the same controlled by the movements of the elevator, substantially as described.

2. In a control device for elevators, the combination with the circuit-breakers, of a mechanically-operated locking device, means for operating the same controlled by the movements of the elevator, and an electrically-controlled locking device controlled by the circuit, substantially as described.

3. The combination with a motor, control device therefor, conductors, and two circuit-breakers at each landing, one controlling the circuit to operate the motor to lift the car and the other to lower it, of locking devices arranged to lock one or the other of the circuit-breakers when in different positions, and means for mechanically moving each locking device as the car passes a landing to a position to prevent the shifting of the circuit-breaker at that landing that would reverse the movement of the car, substantially as described.

4. The combination in a device for controlling elevator-cages from different landings and with the motor, cage and conductors, of two circuit-breakers at each landing, and electrically-actuated locking devices whereby all the circuit-breakers are locked in position after one of them has been shifted, a locking device at each landing to prevent the movement of one or the other of the circuit-breakers, and means for shifting the position of the latter locking device from the car as the latter passes a landing, substantially as described.

5. The combination of the casing, circuit-breakers A', C', push-buttons, locking-plate E and actuating-magnet F, a circuit-breaker D', and means adapted to be operated from the cage for shifting the said circuit-breaker D', substantially as described.

6. The combination of the casing, circuit-breakers A', C', and push-buttons, locking-plate E and electromagnet F, locking device for locking the circuit-breakers A', C', in position alternately, and means adapted to be operated from the cage for shifting said locking devices, substantially as described.

7. The combination of the casing, circuit-breakers A', C', D', electrically-operated devices for simultaneously locking the circuit-breakers A', C', and mechanically-operated devices for locking the circuit-breakers A', C', alternately and for shifting the circuit-breaker D', substantially as described.

In testimony whereof I have signed my name to this specification in the presence of two subscribing witnesses.

ALBERT H. BUCKELEW.

Witnesses:
J. FRED LOCKWOOD,
WM. L. RICKARD.